Oct. 7, 1947.   P. C. GOETZ ET AL   2,428,418
REMOVAL OF SILICA AND OTHER IMPURITIES FROM WATER BY PRECIPITATION
Filed July 3, 1940    4 Sheets-Sheet 1

INVENTORS
PAUL C. GOETZ
HOWARD L. TIGER
BY
ATTORNEY

INVENTORS
PAUL C. GOETZ
HOWARD L. TIGER
BY Clarence D. Kerr
ATTORNEY

Patented Oct. 7, 1947

2,428,418

UNITED STATES PATENT OFFICE 2,428,418

REMOVAL OF SILICA AND OTHER IMPURITIES FROM WATER BY PRECIPITATION

Paul C. Goetz, Mount Holly, N. J., and Howard L. Tiger, Hewlett, N. Y., assignors to The Permutit Company, New York, N. Y., a corporation of Delaware Application July 3, 1940, Serial No. 343,722

16 Claims. (Cl. 210—23)

This invention relates to treatments of water to remove impurities such as silica and fluoride therefrom.

In the art of water conditioning, especially as applied to the conditioning of boiler feed waters, there has been recognized for a long time the desirability of reducing the silica content of waters to a safe maximum. Natural waters frequently contain substantial amounts of silica present in the form of dissolved or dispersed silicates, colloidally dispersed silica or in some other form referred to hereinafter as "silica" or "dissolved silica," as distinguished from sand or other forms of coarsely suspended silica that can be removed from the water by currently used filtration techniques.

The usual methods of treating water do not remove this dissolved silica effectively, and the silica produces a deposit or scale upon the heating surfaces of a boiler or the like, of a dense impervious nature that is very difficult to remove. Silica scale is particularly troublesome and objectionable in connection with high pressure boilers such as those operating at a pressure of 250 lbs. per square inch or more, because it is formed more readily at the higher temperatures employed at these higher pressures.

The extent of silica reduction desirable in practice is now usually determined by the maximum silica concentration that is permissible in the concentrated salines within the boiler.

It has not been particularly difficult to effect some reduction in silica content of a water naturally high in silica, but prior to our invention it was virtually impossible to reduce the silica content of a high silica water to a low value by an external treatment without using expensive chemicals or procedures.

It is frequently desirable to remove other impurities than silica from natural or raw waters. Fluorides occur in water in a dispersed or dissolved form in quantities of the order of about 2 to 4 parts per million and are generally considered to be injurious to the health, and more particularly to the teeth, of persons drinking such water. While a small amount of fluoride of the order of one part per million may be beneficial in drinking water, it is very difficult to reduce the fluoride content of waters naturally high in fluoride to this value. By the process of this invention, fluoride as well as silica and other impurities can be removed efficiently and economically from waters containing them.

An object of the invention is the provision of economical methods of treating water to lower the content of silica, fluoride or other similar impurities therein to a safe value without increasing substantially the total solids in the water and by actually reducing the total solids in the water in most instances.

A further object is to reduce effectively to the desired value the silica content of hard water simultaneously with softening thereof.

Another object is the provision of a method of treating water by subjecting it under controlled conditions to intimate contact with a high-magnesium, silica-absorbing sludge.

Another object is to treat water containing impurities such as silica or fluoride, or both, by contacting it with a magnesium-containing sludge and thereafter precipitating the dissolved magnesium ion from the water as the insoluble magnesium hydroxide.

Another object is the provision of a method of softening water with a dolomitic lime as a means of providing a magnesium-rich sludge useful in removing impurities such as silica and/or fluoride from the water.

A further object is the provision of a method of removing impurities from water by utilizing a magnesium sludge to increase the content of magnesium dissolved in the water and thereafter precipitating such dissolved magnesium as magnesium hydroxide.

Other objects and advantages of the invention will be apparent and will be explained in the following description of several embodiments thereof taken in conjunction with the drawings, in which.

We have discovered that "dissolved" silica can be removed from water very efficiently and economically by subjecting the water under controlled conditions to an intimate contact for a period of time with a sludge rich in magnesium compounds, preferably magnesium oxide and/or magnesium hydroxide. If magnesium salts dissolved in the water are precipitated as the hydroxide simultaneously with the sludge and water contact, especially good silica removal is obtained.

Also, we have discovered that the content of dissolved magnesium of waters can be effectively increased prior to such a sludge-water contact by subjecting the water under properly controlled conditions, such as a low pH environment, to a preliminary contact with a magnesia-containing material such as a magnesium-rich sludge. The preliminary sludge-water contact removes some silica from the water by absorption, and when the water is thereafter treated to precipitatae the dissolved magnesium as magnesium hydroxide and subjected to further contact with a magnesium-rich sludge, silica is carried down by the magnesium hydroxide precipitated and additional silica is absorbed by the sludge. The terms "absorb" or "absorption" referring to the manner of silica removal are used in their broad or generic sense since the removal may be effected by adsorption or absorption, or a combination of both. The effectiveness of silica removal varies considerably with a number of factors discussed below and the best procedure to use will depend a great, deal, therefore, on the composition of the water to be treated and the final composition desired, as well as on the economics of the particular case in question.

It is clear from the preceding discussion that silica may be reduced to the desired extent either—

(a) By precipitating ionic or dissolved magnesium from solution, this precipitate being assumed to be $Mg(OH)_2$, or (b) By contacting the silica-containing water with silica-absorptive magnesium compounds in the undissolved or solid form, such as $MgO$ or $Mg(OH)_2$, or (c) By combining the methods of (a) and (b).

The ionic magnesium of (a) may be present in sufficient concentration in the raw water, or to some lesser extent. If sufficient ionic magnesium is not present, it may be increased by adding a soluble salt of magnesium such as magnesium sulfate, or it may be dissolved from magnesium compounds such as $MgO$ or $Mg(OH)_2$, or from sludge containing such compounds, or from suitable forms of magnesium carbonate. As stated previously, magnesium sulfate is expensive and adds dissolved solids to the water because the precipitation process leaves behind an equivalent amount of dissolved sulfate. $MgO$ or $Mg(OH)_2$ are more desirable, because the cost of the magnesium contained therein is lower and because the magnesium ion can be dissolved therefrom simply by contacting these substances with water of a somewhat lower pH than that prevailing in the magnesium precipitation process. This lower pH environment exists in the raw water itself where some $CO_2$ and $HCO_3^-$ ion are present, so that the magnesium is dissolved from the $MgO$ or $Mg(OH)_2$ according to the following reactions:

(1) $\qquad MgO + CO_2 \rightarrow MgCO_3$ or (2) $\quad MgO + 2HCO_3^- \rightarrow MgCO_3 + CO_3^= + H_2O$ With $Mg(OH)_2$, the reactions are essentially the same. The $MgCO_3$ formed in these reactions is fairly soluble, but, if its solubility is exceeded, it can readily be transformed into the more soluble bicarbonate according to the following reaction:

(3) $\qquad MgCO_3 + CO_2 + H_2O \rightarrow Mg(HCO_3)_2$

When this $MgCO_3$ or $Mg(HCO_3)_2$ is precipitated with a hydroxide, e. g., $Ca(OH)_2$, the following reactions take place:

(4) $\quad MgCO_3 + Ca(OH)_2 \rightarrow Mg(OH)_2 + CaCO_3$ or (5) $Mg(HCO_3)_2 + 2Ca(OH)_2 \rightarrow$
$\qquad\qquad\qquad Mg(OH)_2 + 2CaCO_3 + 2H_2O$ Both of the reaction products obtained according to Equations 4 and 5 are relatively insoluble, and thus the dissolving and precipitation of this magnesium take place without leaving any salts in solution, i. e., without increasing the total dissolved solids.

Where more ionic magnesium is required than is present in the raw water, which is often desirable for silica removal and even more frequently required for effective fluoride removal, and where the raw water does not contain enough $CO_2$ or $HCO_3^-$ to dissolve the required amount of magnesium, $CO_2$ may readily and economically be added by means of flue gas as hereinafter discussed in greater detail. And as stated above, the magnesium may be obtained from various compounds such as $MgO$, $Mg(OH)_2$, or $MgCO_3$. $MgO$ is available on the market as calcined magnesite, and $MgCO_3$ is available as ground magnesite or precipitated magnesium carbonate. $Mg(OH)_2$ is the form in which we believe the magnesium exists when precipitated from solution by the addition of hydroxide as discussed above. We have found that calcined magnesite ($MgO$), precipitated magnesium hydroxide ($Mg(OH)_2$), and precipitated magnesium carbonate (prepared by separating the fairly soluble carbonate from a concentrated solution) are quite suitable for dissolving magnesium according to Reactions 1, 2, or 3 set forth above. We find, however, that magnesium carbonate as it occurs in nature in the form of magnesite ($MgCO_3$) or dolomite ($CaCO_3 \cdot MgCO_3$), even when finely powdered, is relatively insoluble under these conditions and therefore unsuitable for these silica or fluoride removal processes.

One very economical source of magnesium is a sludge containing magnesium compounds, and one very effective means of furnishing such a sludge rich in $MgO$ and $Mg(OH)_2$, is the use of a dolomitic lime instead of a relatively pure lime for precipitating the hardness from the water. In the usual water treatment practice where lime is used, the use of high-purity lime free from magnesia is generally specified. Thus the use of lime containing appreciable amounts of Mg (referred to herein as magnesium-containing lime or dolomitic lime) is contrary to present accepted practice. Such a dolomitic lime which is manufactured by calcining dolomite may be represented by the symbol $CaO \cdot MgO$ when in the fully calcined condition, and by the symbol $$Ca(OH)_2 \cdot MgO$$

when in the so-called hydrated condition. For most purposes, a dolomitic lime containing about 5 to about 45% $MgO$ will be satisfactory.

When such a lime is used in our process, the CaO or Ca(OH)$_2$, as the case may be, serves to precipitate the calcium and magnesium in the water entering the precipitation chamber, according to the well-known reactions that result in the formation of the relatively insoluble CaCO$_3$ and Mg(OH)$_2$. The MgO present in the dolomitic lime simply accumulates in the sludge formed where it mixes with the precipitated CaCO$_3$ and Mg(OH)$_2$. Neither this MgO nor the Mg(OH)$_2$ pass into solution in this chamber, because they remain relatively insoluble in this high pH environment, i. e., a solution in which there is a substantial concentration of OH$^-$ ion. Thus these solid magnesium compounds are available in the sludge from which the magnesium may be dissolved to produce ionic magnesium as discussed above, or these solid magnesium compounds may be utilized for silica absorption purposes in the undissolved condition as discussed below.

An alternate procedure to that of precipitating ionic magnesium for silica removal is to contact the water as indicated above in (b) with silica-absorptive magnesium compounds such as the MgO purchased on the market as calcined magnesite, or the MgO residue in sludge from the use of calcined dolomite as the precipitant, or the Mg(OH)$_2$ in the sludge resulting from the precipitation of the ionic magnesium. When such solid forms of magnesium compounds are utilized, it is merely necessary to agitate the water to be treated for a suitable period with a sufficient concentration of silica absorptive undissolved magnesium compounds so that the absorption may take place. This makes for simpler construction and operation of the equipment than that required when magnesium is dissolved and thereafter precipitated, and therefore, although the specific absorptive capacity of undissolved magnesium compounds is less than that of an equivalent amount of ionic magnesium precipitated from solution (as shown by the graphs on Figs. 5 to 8 compared to Figs. 9 to 12), it may often be desirable to resort to the use of the undissolved or solid form of magnesium compounds rather than to the precipitation of the ionic or dissolved magnesium.

This is especially true where higher temperatures or other favoring conditions exist so that the amount of magnesium compounds required is smaller or where the total volume of water to be treated is smaller, so that the cost of treatment of unit volume is not so important because the total treating cost is not high. In this case, the treating cost is outweighed by the advantages of lower initial equipment cost and greater operating simplicity. Another case where the use of the undissolved magnesium compounds is advantageous is where the raw water is low in hardness so that very little lime is required for its treatment. In such cases, it may be preferable to utilize the undissolved Mg compounds rather than to carry considerable Mg into solution by adding CO$_2$ and thereafter precipitating magnesium.

It follows from the above that in many instances the combined use of both ionic or dissolved and undissolved Mg compounds as indicated above under (C) is desirable. In fact, there is ordinarily some ionic magnesium present in the raw water and therefore, to some extent, the combined use of the dissolved and solid or undissolved magnesium compounds takes place. Frequently at lower temperature ranges, the use of either the ionic magnesium alone or the solid undissolved magnesium compounds alone would require the addition of excessive amounts, and for such temperature ranges it is particularly desirable to combine the use of the dissolved and undissolved forms.

A further feature of our invention is the addition to the water of carbon dioxide obtained from flue gas or some other suitable source prior to or simultaneously with a preliminary contact of the water with a magnesium-rich sludge or other suitable magnesia-bearing material. This modification maks it possible to dissolve larger amounts of magnesium in the water prior to the precipitation of magnesium hydroxide. In fact sufficiently large quantities of magnesium can be dissolved in a water by this procedure to effect the removal of substantial quantities of fluoride as well as silica from the water when this magnesium is subsequently precipitated.

It will be apparent that our invention is particularly adapted for use in combination with the lime soda process of softening water because calcium in the water is precipitated along with the magnesium, effecting thereby a reduction in total hardness and total solids (when the process is applied to a hard water) as well as a removal of silica and/or fluoride. It is to be understood, however, that the invention is not limited to use in connection with the lime soda process or to the treatment of hard water since it may be applied to soft waters containing silica or fluoride or both.

The particular procedure that will be most efficient will depend on a number of variable factors. Of course with some waters, the problem will be simplified. For example, if a water has only a relative low initial silica content such as 6 to 9 parts per million of silica, or if the water contains somewhat more silica but contains relatively large amounts of dissolved magnesium as well, satisfactory removal of silica can be obtained even at low temperatures by forming a magnesium-rich sludge and subjecting the water to intimate contact with this sludge under controlled conditions in a single operation.

Figure 1:
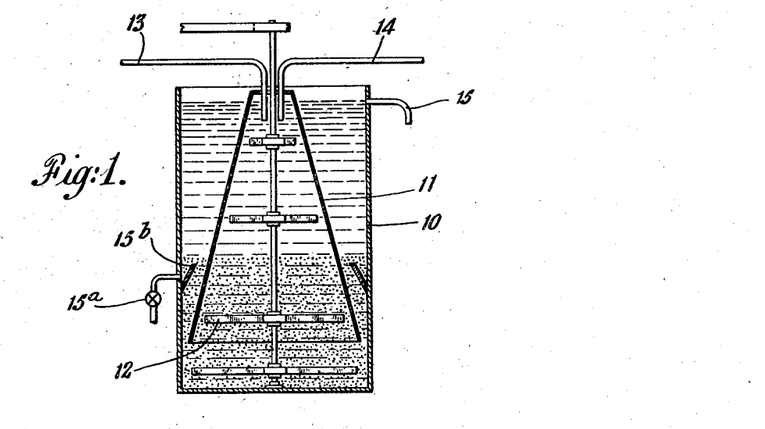
Fig. 1 illustrates diagrammatically apparatus suitable for treating certain waters according to our invention.

Figure 1 illustrates diagrammatically a suitable apparatus for such a treatment and includes essentially a tank 10 provided with a conical baffle 11 and a suitable stirring or agitating device 12 inside the baffle. The water to be treated is introduced inside the baffle 11 through the pipe 13 together with a suitable quantity of dolomitic lime, or the equivalent, at 14. Soda ash may also be added at this point if needed. Calcium and magnesium in the water are thus precipitated as in the lime soda process of water softening, and in addition the MgO in the dolomitic lime ensures the formation of a sludge rich in MgO and Mg(OH)$_2$. The magnesium present in the sludge will be referred to as "sludge magnesium." After sufficient sludge has accumulated in the tank 10, quantities of the sludge should be withdrawn periodically or continuously in approximately the amounts of the new sludge being formed. This sludge may be removed through a suitable blow-off as at 15a. The treated water may be drawn off at 15.

The apparatus illustrated in Fig. 1 is known as a "Spaulding precipitator" and is described in the Spaulding Patents Nos. 2,021,672 and 2,127,314 for use in softening water by the lime-soda process. Other suitable forms of apparatus, however, for effecting a good contact between water and a sludge may be used.

The extent of silica removal effected by treatment of the water with the aid of an artificially enriched magnesium sludge depends upon the following factors:

(1) the initial silica content of the water
(2) the extent of silica contamination of the magnesium-containing sludge
(3) the amount of ionic magnesium precipitated from the water
(4) the temperature at which the treatment is carried out
(5) the sludge magnesium concentration maintained dispersed or suspended in the water, and
(6) the length of time of the contact between the water and the sludge magnesium.

By the term "ionic magnesium" is meant the magnesium in the magnesium salt or salts dissolved in the water.

The amount of silica in the water to be treated has a direct effect on the final silica content of the treated water because the magnesium compounds in the sludge absorb silica from the water and gradually build up the absorbed silica content of the sludge until an equilibrium is reached when the amount of silica absorbed equals the amount of silica being withdrawn from the tank in the sludge taken off at the blow-off $15a$.

The efficiency of silica absorption by the undissolved magnesium compounds present in the sludge is dependent upon the extent of silica contamination of this sludge. In other words, the higher the amount of silica that has been absorbed by each milliequivalent of magnesium compounds in the sludge, the less will be the quantity of silica that can be absorbed by this sludge. For a given concentration of undissolved mangesium compounds in the system under a given set of operating conditions, the degree of silica contamination is dependent upon the amount of sludge discharged to waste per unit volume of water treated and the corresponding amount of fresh magnesium compounds introduced into the system to replace these silica-contaminated magnesium compounds which have been discharged to waste.

In addition to the absorption of silica by the sludge magnesium, silica is removed from the water by the precipitation of the ionic magnesium as magnesium hydroxide. This precipitate, formed in the water by the addition of lime, or other suitable reagent that adds the necessary hydroxide radical, carries down with it very substantial quantities of silica and consequently the greater the decrease in the ionic magnesium content of the water, the more silica will be removed. Also, the greater the amount of the ionic magnesium precipitated from the raw water, the greater will be the enrichment of the sludge in silica-absorbing sludge magnesium compounds. Thus, if a water is naturally high in ionic magnesium, dolomitic limes with smaller magnesia contents and in some cases even ordinary limes may be used for softening.

Temperature has a marked effect on the amounts of silica removed from water by absorption and by precipitation of magnesium hydroxide. Up to about 40 or 50° C. the amount of silica removed under a given set of operating conditions increases rapidly with increases in temperature, but as the temperature is increased above 40 to 50° C. the quantities of silica removed do not increase in proportion. Conversely, lower sludge magnesium and ionic magnesium concentrations and shorter contact times may be used successfully when the water is treated at elevated temperatures.

The amount of sludge magnesium in contact with the water is important also and is an essential and limiting factor in determining the amount of silica that will be removed from a given water under certain conditions. The concentration of sludge magnesium is dependent on (1) the magnesium content of the sludge and (2) the amount of sludge maintained in contact or suspended in intimate contact with the water. For example, if a given sludge contains 25% of sludge magnesium and a sludge concentration in the water of 4% is maintained by agitation or otherwise during treatment, the sludge magnesium concentration will be 1%. For greater convenience and accuracy, the concentrations of sludge magnesium and ionic magnesium in the water will be expressed in terms of milli-equivalents per liter (m. eq./l.). By this term is meant a milligram equivalent weight per liter, which in the case of magnesium would be 0.0121 gram per liter.

The length of time that the sludge magnesium is maintained in contact with the water or contact time likewise affects the amount of silica absorbed by the sludge magnesium, i. e., other conditions being equal, a longer contact period results in better silica removal. The effect of the time of this contact is more noticeable, however, with shorter contact times and usually it is not practical or economical to use a contact time of several hours because of the small advantage in silica removal thus gained. In a batch operated process, of course, the contact time includes not only the period during which the sludge is maintained in intimate contact with the water by agitation or otherwise, but also the first part of the period during which the sludge is allowed to settle preparatory to treatment of another batch of water. The time of contact for a continuous process as in the Spaulding precipitator shown in Fig. 1 can be readily computed by dividing the volume of water in contact with the sludge at any given time by the rate of flow of water into and out of the apparatus.

Figure 8:
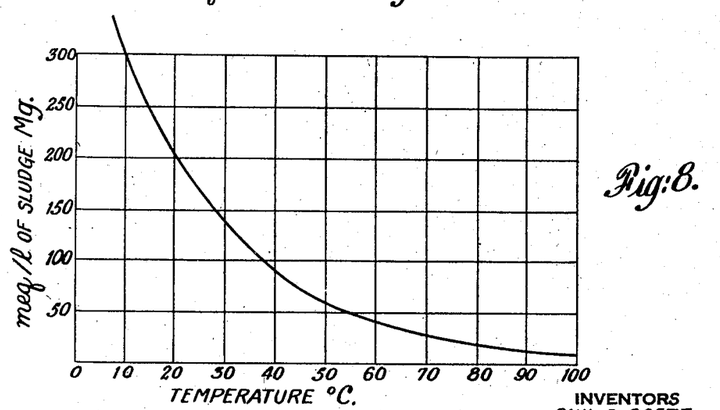
Fig. 8 is a curve showing the amounts of sludge magnesium needed to lower the silica content of water to 3 parts per million at different temperatures.

The curves in Figs. 5 to 12, inclusive, show the individual effects of two of these variables at different temperatures on the removal of silica from a water containing about 15 parts per million of silica. The curves in Figs. 5, 6 and 7 were prepared by treating samples of this water at 10° C., 40° C. and 90° C., respectively, with different amounts of a sludge obtained from a lime softening plant and containing about 30% by weight of magnesium compounds in the form of MgO and Mg(OH)$_2$. In each case, the sludge was added to the water, agitated in the water for 30 minutes, centrifuged for 5 minutes, and the water then filtered through paper, cooled if necessary, and its final silica content determined. The curve in Fig. 8 is a composite curve made from the curves in Figs. 5, 6 and 7 to show the amounts of sludge magnesium needed at different temperatures to reduce the silica content from 15 parts per million to 3 parts per million without precipitating any ionic magnesium.

Figure 9:
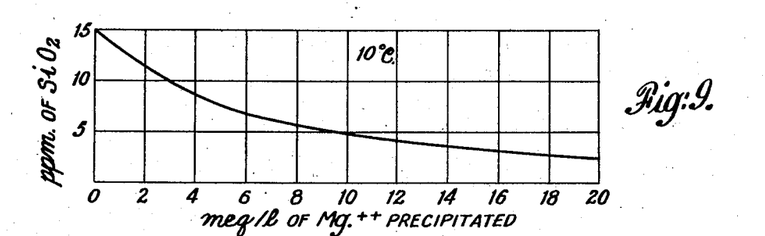
Figs. 9, 10 and 11 are curves showing the effect of the amount of ionic magnesium precipitated, when removal of silica from water is effected at different temperatures.
Figure 10:
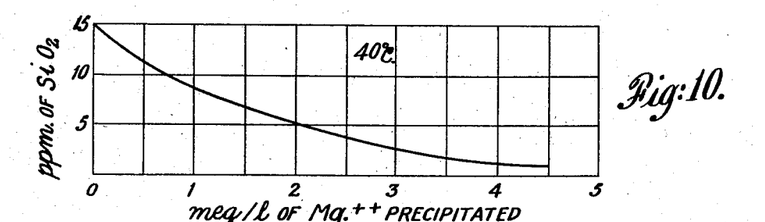
Figure 11:
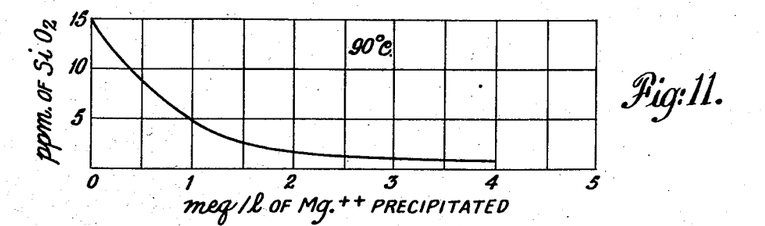
Figure 12:
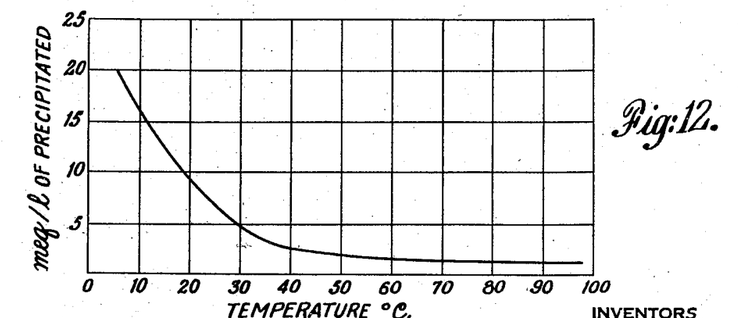
Fig. 12 is a curve showing the amounts of ionic magnesium that have to be precipitated to lower the silica content to 3 parts per million at different temperatures.

The curves in Figs. 9, 10 and 11 similarly show the effect of precipitating different quantities of ionic magnesium at temperatures of 10° C., 40° C., and 90° C., respectively, on the removal of silica from water. In preparing these curves, samples of water containing in each case about 15 parts per million of silica and varying quantities of ionic magnesium were treated by adding sufficient chemically-pure lime at the temperatures indicated to precipitate most of the ionic magnesium. These samples of water, after addition of the lime, were agitated for 30 minutes, after addition of the lime, were agitated for 30 minutes, filtered through paper, cooled when necessary and tested quantitatively for silica. Fig. 12 shows a composite or master curve made from the curves in Figs. 9, 10 and 11 to show the amounts of ionic magnesium that have to be precipitated at different temperatures to reduce the silica content of water from 15 parts per million to 3 parts per million by the precipitation of $Mg(OH)_2$ alone.

By way of illustrating one method of carrying out our invention in an apparatus of the type shown in Fig. 1, the following example is given although it is to be understood that the invention is not limited to the details of this particular example.

Example I

A raw water containing 6.0 m. eq./l. of total hardness of which 3.2 m. eq./l. was ionic magnesium or magnesium hardness, 5.0 m. eq./l. of methyl orange alkalinity and 16 to 18 parts per million of silica ($SiO_2$), was continuously introduced through the line 13 into the Spaulding precipitator 10 at a temperature of 15° C. and agitated therein with 1.9% by weight of a sludge containing about 325 m. eq./l. of magnesium compounds, of which about 71% were derived from dolomitic lime and about 29% from the precipitation of ionic magnesium. On a weight basis, this sludge contained about 40% of magnesium compounds and 60% of calcium compounds, principally calcium carbonate, and had been accumulated in the Spaulding precipitator from the previous treatment of water according to this process.

Dolomitic lime was fed into the apparatus continuously through line 14 at a sufficient rate to precipitate about 2.2 m. eq./l. of the ionic magnesium, and the sludge was maintained in intimate contact with the water for about 80 minutes. The effluent drawn off at 15 under these conditions contained about 2.7 parts per million of silica.

When the foregoing procedure was altered by treating the water at 9° C., the silica content of the effluent was found to be 4.1–4.4 parts per million.

When this procedure as given above for treating water at 15° C. was changed by increasing the rate of flow of the water so as to reduce the contact time of the sludge and water from 80 to 45 minutes, the silica content of the effluent was found to be 4.3–4.8 parts per million.

Under less favorable conditions such as in the treatment of a water low in or free from ionic magnesium, or very high in silica, or both, we prefer to subject the water to contact with a magnesium-containing sludge or similar magnesia bearing material prior to the addition of softening chemicals. Such a preliminary contact between the sludge and water effects the removal of some of the silica from the water by absorption and, if carried out under the proper conditions, increases the ionic magnesium content of the water, thereby increasing the amount of magnesium hydroxide precipitated at the next stage when the lime or dolomitic lime is added.

This procedure may be carried out intermittently or continuously. For intermittent or batch operation, a quantity of water is run into a suitable vessel and agitated for a period of time with a suitable quantity of a magnesium-rich sludge. The softening chemicals are then added to and mixed into the water and then the sludge formed is allowed to settle out after being agitated in contact with the water for a period of time. The treated water may now be drawn off leaving all of the sludge, or a sufficient quantity of it, in the tank for the treatment of the next batch of water.

Figure 2:
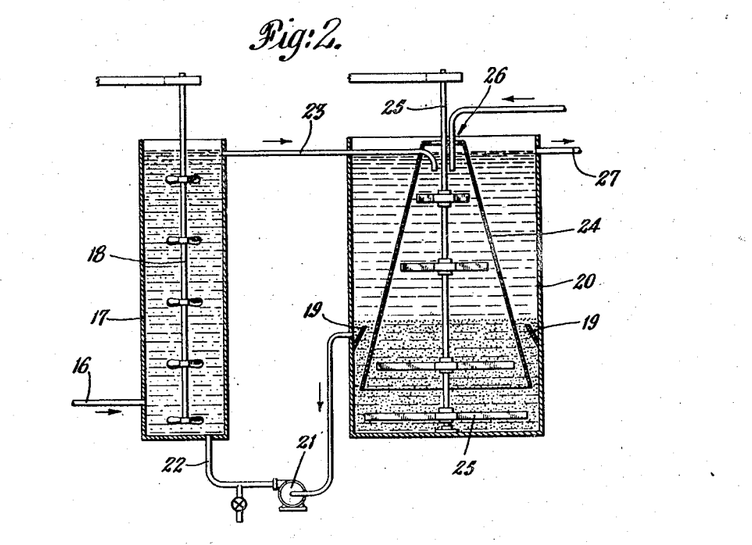
Fig. 2 shows diagrammatically the apparatus of Fig. 1 together with means for subjecting the water to a preliminary sludge contact.

If this process is used to treat water continuously, apparatus such as shown in Fig. 2 may be employed. In such a continuous process, the raw water is introduced through the line 16 into the tank 17 equipped with a suitable agitating or stirring device 18. Sludge is removed from a pocket 19 in the Spaulding precipitator 20 and introduced by means of the pump 21 and the line 22 into the lower portion of the tank 17 where it is mixed with the incoming raw water. This sludge is maintained in intimate contact with the water throughout the tank 17 by the agitator, and the mixture of sludge and water is drawn off from the top of tank 17 through the pipe 23 and introduced inside the conical baffle 24 of the Spaulding 20. The Spaulding agitator 25 thoroughly mixes the water, sludge and softening chemicals such as lime or dolomitic lime, and soda ash if it is needed, that are introduced inside the baffle 24 as indicated at 26. The effluent, or treated water that has been softened and has its silica content effectively reduced is withdrawn from the Spaulding at 27 and is preferably filtered through a non-siliceous filtering medium to remove any turbidity.

The effectiveness of the removal of silica from water by this procedure depends not only on the initial silica and ionic magnesium contents of the water, temperature of the treatment, the contact time and sludge magnesium concentration in the Spaulding precipitator as described above and as shown by the curves in Figs. 5 to 12, but also on the initial bicarbonate content of the water, the contact time and sludge magnesium concentration in the preliminary agitation tank 17. By removing the sludge from the Spaulding 20 and mixing it with the raw water in the tank 17, the MgO and $Mg(OH)_2$ in the sludge are brought into intimate contact with the raw water under lower pH conditions than prevail in the Spaulding where the alkaline softening chemicals are added. The magnesium under such conditions tends to go back into solution and thus substantially increases the ionic magnesium content of the water. The composition of the raw water, especially its $CO_2$ and bicarbonate content, has an important effect on the amount of ionic magnesium picked up by the water from the sludge.

Absorption of some silica from the water by the sludge magnesium compounds also takes place during the preliminary sludge and water agitation as well as after the softening chemicals have been added, and this absorption is increased with longer contact times, higher temperatures and high sludge magnesium concentrations. In the preliminary sludge-water treatment as well as in the final sludge-water contact, the absorption of silica does not appear to be affected by the calcium compounds in the sludge, but depends almost entirely on the amount of magnesium compounds suspended in the water. An allowance should be made, however, for the amount of silica already absorbed in a sludge because a sludge of a given magnesium content will not absorb silica as readily if it is already contaminated with absorbed silica as indicated above.

The following are examples of treatments of water by the batch and continuous methods described above and utilizing a preliminary sludge and water contact before the softening chemicals are added to the water.

Example II 300 gallons of a raw water containing 2.6 m. eq./l. of total hardness of which 0.3 m. eq./l. was ionic magnesium or magnesium hardness, 2.3 m. eq./l. of methyl orange alkalinity and 16 to 18 parts per million of silica was introduced at a temperature of 12° C. into a precipitating tank containing the accumulated magnesium-rich sludge from the similar treatment of 70 previous batches of this raw water softened with soda ash and a dolomitic lime containing 32% MgO. This sludge contained about 200 m. eq./l. of MgO and Mg(OH)$_2$ of which about 58% was derived from dolomitic lime and 42% from the precipitation of ionic magnesium, and about 280 m. eq./l. of calcium compounds, principally calcium carbonate. After agitating the water for 45 minutes with this sludge which produced a sludge concentration of about 1.8% by weight, sufficient soda ash and dolomitic lime were added to the water to precipitate the hardness. Agitation was continued after this addition for a further 30 minutes, the sludge was allowed to settle, and the water was then drawn off and filtered. The final silica content of the treated water after filtering was found to be 1.7 parts per million.

During the initial 45 minute agitation period, the ionic magnesium content of the water was increased from 0.3 to 1.0 m. eq./l.

Example III

A raw water containing 2.5 m. eq./l. of total hardness of which 0.3 m. eq./l. was ionic magnesium or magnesium hardness, 2.3 m. eq./l. of methyl orange alkalinity and 16 to 18 parts per million of silica was flowed continuously through the line 16 into the chamber 17 as shown in Fig. 2 at a temperature of 43° C. Sludge from the Spaulding precipitator 20 containing about 680 m. eq./l. of magnesium compounds of which about 41% were derived from dolomitic lime and 59% from precipitation of ionic magnesium, was introduced into the chamber 17 by the pump 21. The rates of flow of water and sludge were controlled so that the water (carrying sludge in suspension) flowing into the Spaulding through the line 23 had its ionic magnesium content increased to about 1.2 m. eq./l. Dolomitic lime containing 32% MgO was added to the water and sludge continuously at 26 in quantities calculated to provide a slight excess over the amount theoretically required to effect complete softening. The dosed water was agitated in the Spaulding 20 with about 5.1% by weight of the sludge described above for about 40 minutes, and the effluent from the Spaulding was found to contain only 1.4 to 1.8 parts per million of silica.

A further modfication of our process may be employed for treating waters high in silica or containing silica and fluoride. This modification is based on the preliminary sludge and water contact described above and includes the treatment of the water with carbon dioxide prior to or simultaneously with the preliminary agitation of sludge and water. The carbon dioxide may be obtained from flue gas or any other convenient source. By simply bubbling flue gas through the water, a sufficient amount of carbonic acid or bicarbonate is formed in the water to increase materially the amount of ionic magnesium picked up by the water from the sludge. Any excess of carbonic acid remaining in the water as such requires the addition of extra lime during softening so that we prefer not to use an excess of $CO_2$, or to remove any such excess by aeration of the water prior to the addition of the softening chemicals.

Figure 3:
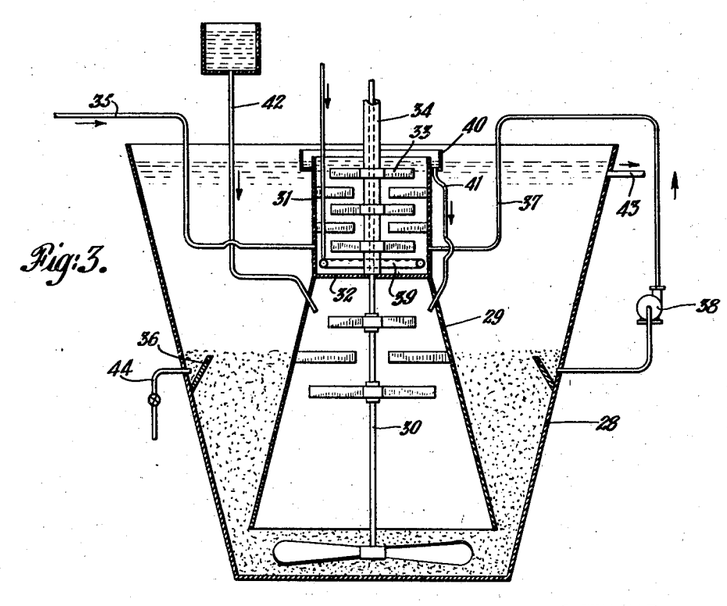
Figs. 3 and 4 illustrate diagrammatically other forms of apparatus for treating water according to our invention.
Figure 4:
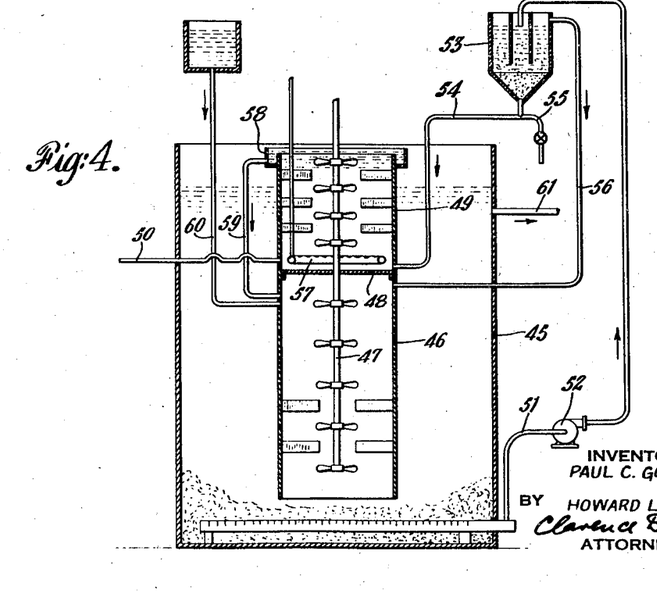
Figure 5:
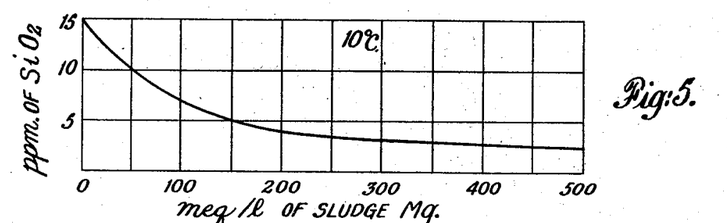
Figs. 5, 6 and 7 are curves showing the effect of sludge magnesium concentration on removal of silica from water at different temperatures.
Figure 6:
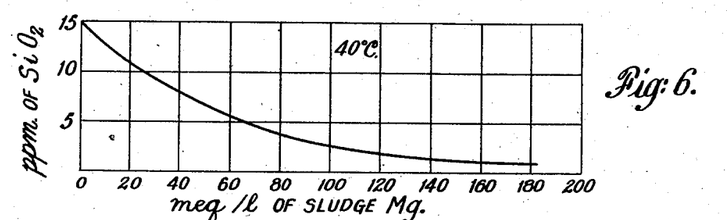
Figure 7:
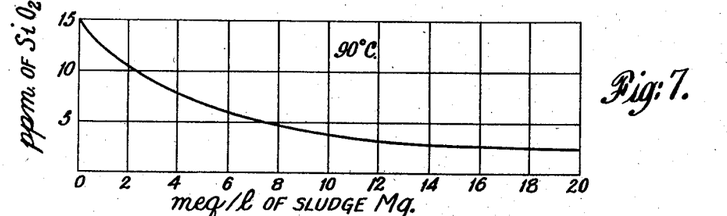

Suitable forms of apparatus for use in removing silica from water and utilizing carbonation in conjunction with a preliminary sludge and water contact, are illustrated in Figs. 3 and 4. It is to be noted that the carbonation of the water makes it possible to increase the ionic magnesium content of the water to a high value without using a long contact time for the preliminary contact between the sludge and water. Therefore, the preliminary sludge-water contact and the carbonation with flue gas or other $CO_2$ containing gas may be carried out simultaneously in a very small vessel. Also, if the water to be treated already is high in $CO_2$ and/or bicarbonates, the contact time for the preliminary sludge and water contact may be shortened and a small vessel used without adding the flue gas.

The apparatus shown in Fig. 3 is a modified Spaulding 28 provided with a conical baffle 29 and a suitable agitator 30. The upper portion of the conical baffle 29 is converted into a small preliminary agitation chamber 31 separated from the rest of the apparatus by the solid partition 32, thus utilizing an otherwise waste space at the upper end of the conical baffle of the Spaulding. The small chamber 31 may be provided with a high speed agitator 33 mounted on and driven by a hollow shaft 34 surrounding the shaft of the main agitator 30. Fixed blades may be employed in conjunction with these rotating agitators 30 and 33 if needed.

The raw water to be treated is introduced into chamber 31 through the line 35 together with sludge from the sludge pocket 36 introduced through the pipe 37 by means of the pump 38. If needed, flue gas or other $CO_2$ containing gas may be introduced into the water at this point by the carbonating ring 39. The treated water with sludge suspended therein overflows from chamber 31 into the trough 40 and is carried from there by the line 41 down into the interior of the conical baffle 29. Lime, dolomitic lime or other suitable softening chemicals may be added at this point through the line 42 and are mixed with the pre-treated water inside the conical baffle 29. The softened water from which imprities have been removed may be drawn off at 43. Used sludge may be removed from the apparatus periodically or continuously through the blow-off 44 associated with the pocket 36 at a rate designed to maintain a fairly uniform quantity of sludge in the apparatus. The pocket 36 may extend completely around the apparatus or consist of one or more smaller pockets suitable for collecting the sludge in a fairly thick condition.

The apparatus shown in Fig. 4 is similar in construction and operation to the apparatus shown in Fig. 3. This apparatus is a modification of conventional apparatus used for the cold lime-soda softening of water and consists of a tank 45 provided with a centrally located fixed cylindrical baffle 46 and a suitable agitator 47 inside this baffle. A partition 48 inside baffle 46 divides off the upper portion thereof to form a preliminary agitation chamber 49. The agitator 47 may be so constructed as to provide agitation for liquid inside the chamber 49 as well as inside the lower portion of baffle 46. Fixed blades may be employed in conjunction with the rotating agitator blades if needed. Raw water may be introduced into chamber 49 through the line 50 and sludge withdrawn through the line 51 by pump 52 is preferably thickened in the sludge thickener 53 before being fed into chamber 49 through the line 54. A sludge blow-off 55 may be provided just below the thickener 53 and to avoid any waste of softened water, the water separated from the sludge in the sludge thickener 53 may be returned through line 56 to the precipitating tank inside of baffle 46. If needed, flue gas may be introduced into the water during its preliminary agitation with the sludge in the chamber 49 by means of the carbonating ring 57.

The water carrying sludge suspended therein after the preliminary agitation treatment overflows from chamber 49 into the trough 58 and is conducted into the precipitation tank inside baffle 46 through the line 59. Lime, dolomitic lime or other suitable chemicals may be added to the water at this stage through the line 60. The treated water may be drawn off from the upper portion of the space surrounding baffle 46 through the line 61 and filtered, if this is necessary.

The filtration of water treated according to our invention is not essential but is usually desirable to remove any turbidity remaining in the water. Such a filtration usually produces a final effluent with a lower silica content than the unfiltered softened water.

The following examples illustrate the effect of adding $CO_2$ to the water to promote the dissolving of ionic magnesium in the water prior to softening. Although the apparatus in Figs. 3 and 4 shows the carbonation applied during the preliminary agitation of sludge and water, it is to be understood that this treatment of the water with flue gas or carbonation may be carried out in a separate tank or apparatus before the water is first brought into contact with the sludge. Under some conditions, this latter procedure may be preferable even though it requires an additional treating chamber.

*Example IV*

Raw water containing 2.5 m. eq./l. of total hardness of which 0.3 m. eq./l. was ionic magnesium, 2.3 m. eq./l. of methyl orange alkalinity and 16 to 18 parts per million of silica was treated with carbon dioxide gas to dissolve $CO_2$ in the water. This water with $CO_2$ added then had its ionic magnesium content increased to 3.0 m. eq./l. by agitation in a separate chamber with sludge that was withdrawn from a precipitating tank and contained about 630 m. eq./l. of magnesium compounds of which about 67% were derived from dolomitic lime and about 33% from ionic magnesium. The water with its increased ionic magnesium content and carrying suspended sludge was introduced continuously into the precipitating tank, dosed with a slight excess of dolomitic lime containing 32% MgO to effect softening, and agitated at a temperature of 19° C. with a concentration of about 5.3% by weight of the magnesium-rich sludge for approximately 40 minutes. The effluent from the precipitating tank was found to contain 2.3 to 3 parts per million of silica.

*Example V*

In a process of treating water as described in Example IV, the time of the water in contact with the sludge in the precipitating tank was increased from 40 to 80 minutes and the precipitating tank effluent was found to contain 2 parts per million of silica. After filtering this effluent, the silica content of the water was further reduced to about 1.5 parts per million.

*Example VI*

A raw water as described in Example IV was treated similarly with carbon dioxide and preliminary agitation with sludge until its ionic magnesium content had increased to 3.4 m. eq./l. This water was then softened with dolomitic lime and agitated at 18° C. with 2.9% by weight of a sludge containing about 350 m. eq./l. of magnesium compounds of which about 67% were derived from dolomitic lime and about 33% from precipitation of ionic magnesium. After maintaining this sludge and water in intimate contact for about 80 minutes, the precipitating tank effluent had a silica content of 3.2 parts per million. By filtering this effluent through a non-siliceous granulated coal filtering medium, the silica content of the water was reduced to 1.8 parts per million.

The foregoing procedure for treating water offers an effective and economical means of artificially enriching water in ionic magnesium which can be precipitated subsequently to remove fluoride as well as silica from the water. Since large quantities of ionic magnesium must be precipitated for effective fluoride removal, the use of flue gas in conjunction with preliminary agitation of the water with a magnesium-rich sludge is particularly suited for this purpose because of the large quantities of ionic magnesium that can be dissolved in the water by this procedure.

The process of this invention, whether utilized for removing silica, fluoride, or other impurities from water, is very economical to operate, particularly when it is employed in conjunction with a cold or hot lime soda softening process. Also, apparatus already in use for softening water by these processes may be readily converted, or used without any substantial changes, for the removal of silica as well as the softening of the water. A surprising feature of the process is that no more lime is needed for softening the water in the precipitating tank than would be needed for ordinary lime soda softening, unless $CO_2$ is added to the water for increasing the ionic magnesium content beyond that possible by straight preliminary agitation.

This is explained by the following facts. In the ordinary softening process, lime is added to convert the dissolved $CO_2$ and the bicarbonate ion to the carbonate according to the following equations:

$$CO_2 + Ca(OH)_2 \rightarrow CaCO_3 + H_2O$$

$$2HCO_3^- + Ca(OH)_2 \rightarrow CaCO_3 + CO_3^{--} + 2H_2O$$

Now when the water is first brought into contact with a magnesia-bearing sludge prior to the addition of lime, the $CO_2$ and bicarbonate in the water react to form magnesium carbonate according to the following equations:

$$CO_2 + MgO \rightarrow MgCO_3$$

$$2HCO_3^- + MgO \rightarrow MgCO_3 + CO_3^{--} + H_2O$$

The magnesium carbonate thus formed requires no more lime for its precipitation than the $CO_2$ and bicarbonate used up in forming it, would have required.

The term "lime," as used in the claims, is used in its broad sense to include not only a relatively pure calcium oxide or hydrate but also such impure limes as the different grades of dolomitic limes.

The terms and expressions which we have employed are used as terms of description and not of limtation, and we have no intention, in the use of such terms and expressions, of excluding any equivalents of the features shown and described or portions thereof, but recognize that various modifications are possible within the scope of the invention claimed.

We claim:

1. A process of removing impurities from water comprising increasing the ionic magnesium content of said water by subjecting the water to intimate and thorough contact with a magnesia bearing material, thereafter adding a lime to precipitate said ionic magnesium and form a sludge, and agitating the water with such a sludge to obtain an intimate and thorough contact between the sludge solids and the water.

2. A process of removing impurities such as silica or fluoride from water comprising carbonating the water, subjecting the water to intimate contact with a magnesia bearing material to increase the ionic magnesium content of the water, and thereafter adding lime to precipitate said ionic magnesium while agitating the water with a magnesium rich sludge obtained from such a precipitation to effect an intimate and thorough contact between the sludge and water.

3. A process of removing silica from water comprising subjecting said water to intimate contact with a substantial quantity of a magnesium rich sludge for a sufficient time to increase the ionic magnesium content of the water, thereafter precipitating said ionic magnesium by the addition of lime to form a sludge, and agitating the water with such a sludge for a substantial period of time.

4. In a process of removing silica from water capable of dissolving magnesia compounds, the steps of dissolving magnesia compounds in the water by adding thereto a sludge containing magnesia obtained from a softening treatment, and thereafter adding lime to the water and simultaneously agitating the water with a further quantity of said sludge.

5. A process of removing silica from water comprising adding carbon dioxide to water while it is in contact with a magnesium-rich sludge obtained from a softening treatment to increase the ionic magnesium content of said water, thereafter adding dolomitic lime to the water to precipitate magnesium hydroxide, and agitating said water with an accumulation of precipitated sludge to maintain for a substantial period of time an intimate and thorough contact between the water and the sludge solids.

6. A continuous process of treating water to lower the silica content thereof comprising flowing a stream of said water through a vessel, increasing the ionic magnesium content of the water while in said vessel, flowing said water into a second vessel and adding thereto from time to time lime to precipitate magnesium hydroxide, agitating the water in said second vessel with an accumulation of sludge from said precipitation, and allowing the sludge solids to substantially settle out before the water is withdrawn from said second vessel.

7. In a process of removing impurities from water, the steps of adding carbon dioxide to the water and subjecting it to contact with a magnesia bearing sludge, aerating said water to remove excess carbon dioxide therefrom, softening said water with lime to precipitate magnesium hydroxide, and agitating the water with sludge resulting from such a softening treatment.

8. In a process of removing impurities such as silica from water, the steps of adding to the water lime and magnesia to form a magnesium-rich sludge, and subjecting the water prior to said addition to an intimate mixing with a quantity of such magnesium-rich sludge under sufficiently low pH conditions to increase the ionic magnesium content of the water before the lime is added thereto.

9. A continuous process of removing dissolved impurities such as silica from water comprising flowing the water together with a magnesium-rich sludge derived from a subsequent treatment into a container, agitating the sludge and water therein under sufficiently low pH conditions to increase the ionic magnesium content of the water, flowing the water from said container into a second container, adding dolomitic lime to the water in said second container to precipitate the ionic magnesium and form a magnesium-rich sludge, removing the treated water from said second container, and returning a quantity of said sludge to said first container.

10. A continuous process of removing dissolved impurities such as silica from water comprising flowing the water together with a magnesium-rich sludge derived from a subsequent treatment into a container, agitating the sludge and water therein under sufficiently low pH conditions to increase the ionic magnesium content of the water, flowing the water from said container into a second container, adding dolomitic lime to the water in said second container to precipitate the ionic magnesium and form a magnesium-rich sludge, agitating the water with an accumulation of such sludge for a period of time, removing the treated water from said second container, and returning a portion of said magnesium-rich sludge to said first container.

11. The process of removing from a water containing bicarbonate alkalinity an impurity taken from the group consisting of dissolved silica and fluorine which comprises treating the water with magnesia, thereafter with lime, and finally clarifying the treated water.

12. In the process for removing dissolved impurities of the class comprising silica and fluorine from water containing bicarbonate alkalinity by means of adsorption by magnesium hydroxide precipitated in situ, the improvement which comprises contacting said water with magnesium oxide to secure a solution of magnesium carbonate, thereafter adding lime to such treated water to form a precipitate containing magnesium hydroxide, and thereafter clarifying the water.

13. A process for removing from water dissolved impurities of the class consisting of silica and fluorine which comprises dissolving carbon dioxide in the water containing this class of impurities, subjecting this water to contact with solid particles of a compound taken from the class consisting of magnesium oxide and magnesium hydroxide, precipitating magnesium hydroxide from the water by treatment with lime, and separating the precipitate from the water.

14. A process of removing dissolved impurities of the class consisting of silica and fluoride from a water containing bicarbonate which comprises mixing such water with material of the class consisting of magnesium oxide and magnesium hydroxide to increase the amount of magnesium dissolved in the water, thereafter precipitating said dissolved magnesium by the addition of a lime to the water, and separating the treated water from insoluble suspended matter.

15. A process for removing from water dissolved impurities of the class consisting of silica and fluoride which comprises mixing said water with carbon dioxide and a compound selected from the class consisting of magnesium oxide and magnesium hydroxide to produce a liquid containing magnesium carbonate, thereafter treating said water with lime, and finally separating solids from the water.

16. In a process of removing from water dissolved impurities of the class consisting of silica and fluoride, the steps of introducing into intimate contact with said water carbon dioxide and a sludge from a softening treatment containing sufficient magnesia to increase the amount of magnesium dissolved in the water, thereafter precipitating said dissolved magnesium by the addition of lime to the water, and separating precipitated solids from the water.

PAUL C. GOETZ.
HOWARD L. TIGER.

REFERENCES CITED

The following references are of record in the file of this patent:

UNITED STATES PATENTS

| Number | Name | Date |
|---|---|---|
| 1,964,487 | Smith | June 26, 1934 |
| 2,044,582 | Lykken et al. | June 16, 1936 |
| 748,308 | Reisert | Dec. 29, 1903 |
| 2,128,393 | Allen | Aug. 30, 1938 |
| 1,533,778 | Walker | Apr. 14, 1925 |
| 1,966,733 | Reimers | July 17, 1934 |
| 654,393 | Handy | July 24, 1900 |
| 2,115,188 | Atkinson et al. | Apr. 26, 1938 |
| 1,962,096 | Price | June 5, 1934 |
| 2,021,672 | Spaulding | Nov. 19, 1935 |
| 2,127,314 | Spaulding | Aug. 16, 1938 |
| 2,207,725 | Elvove | July 16, 1940 |
| 1,315,836 | Hoffman | Sept. 9, 1919 |
| 1,752,795 | Hoover et al. | Apr. 1, 1930 |
| 973,992 | Sutro | Oct. 25, 1910 |
| 2,245,587 | Hughes | June 17, 1941 |
| 2,245,589 | Hughes | June 17, 1941 |
| 1,653,272 | Green et al. | Dec. 20, 1927 |
| 1,823,605 | Hoover | Sept. 15, 1931 |
| 1,927,148 | Behrman | Sept. 19, 1933 |
| 2,182,286 | Doennecke et al. | Dec. 5, 1939 |
| 1,756,275 | Behrman | Apr. 29, 1930 |
| 206,161 | Bohlig | July 23, 1878 |
| 2,307,466 | Noll et al. | Jan. 5, 1943 |

FOREIGN PATENTS

| Number | Country | Date |
|---|---|---|
| 3,730 | Great Britain | 1886 |
| 12,875 | Great Britain | 1902 |
| 447,381 | Great Britain | May 18, 1936 |
| 446,374 | Great Britain | May 27, 1937 |
| 4,536 | Great Britain | Dec. 1, 1877 |
| 423,795 | Great Britain | Feb. 4, 1935 |